United States Patent
Mitamura (10) Patent No.: US 9,456,103 B2
(45) Date of Patent: Sep. 27, 2016

(54) IMAGE READING APPARATUS AND IMAGE FORMING APPARATUS FOR REMOVING FOREIGN MATTERS FROM A DOCUMENT SURFACE

(71) Applicant: CANON KABUSHIKI KAISHA, Tokyo (JP)

(72) Inventor: Akiyuki Mitamura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/106,586

(22) Filed: Dec. 13, 2013

(65) Prior Publication Data

US 2014/0168722 A1     Jun. 19, 2014

(30) Foreign Application Priority Data

Dec. 18, 2012   (JP) .................. 2012-275587

(51) Int. Cl.
  *H04N 1/36* (2006.01)
  *H04N 1/00* (2006.01)
  *H04N 1/12* (2006.01)
  *H04N 1/193* (2006.01)

(52) U.S. Cl.
  CPC ...... *H04N 1/00909* (2013.01); *H04N 1/00649* (2013.01); *H04N 1/00708* (2013.01); *H04N 1/00745* (2013.01); *H04N 1/00782* (2013.01); *H04N 1/125* (2013.01); *H04N 1/1235* (2013.01); *H04N 1/193* (2013.01); *H04N 2201/0081* (2013.01)

(58) Field of Classification Search
  CPC .......................................... H04N 1/00
  USPC .......................................... 358/424
  See application file for complete search history.

(56) References Cited

U.S. PATENT DOCUMENTS

2006/0029420 A1*  2/2006  Ishii et al. ............. 399/111
2010/0085616 A1*  4/2010  Shinno et al. .......... 358/498

FOREIGN PATENT DOCUMENTS

JP        2000270152 A  *  9/2000

* cited by examiner

*Primary Examiner* — Marivelisse Santiago Cordero
*Assistant Examiner* — Kevin Ky
(74) *Attorney, Agent, or Firm* — Canon U.S.A., Inc. IP Division (57) ABSTRACT

An image reading apparatus includes a transparent member disposed at a document pass position, an image reading unit configured to read an image of a passing document through the transparent member, and a rotating cleaning unit configured to rotate to clean a document pass surface of the transparent member. The rotating cleaning unit includes a main body rotatable centering on a rotational axis, a first cleaning member supported by the main body, and configured to scrape foreign matters on the document pass surface during rotation of the main body, and a second cleaning member supported by the main body, and configured to enable sweeping foreign matters on the document pass surface during rotation of the main body.

22 Claims, 11 Drawing Sheets

READING POSITION

READING POSITION

FIG. 8A

READING POSITION

READING POSITION

IMAGE READING APPARATUS AND IMAGE FORMING APPARATUS FOR REMOVING FOREIGN MATTERS FROM A DOCUMENT SURFACE

BACKGROUND OF THE INVENTION

1. Field of the Invention

The present invention relates to an image reading apparatus for reading image information of a document, and an image forming apparatus including the image reading apparatus.

2. Description of the Related Art

Conventional image reading apparatuses is provided with an automatic document conveyance apparatus (auto document feeder). Specifically, in such an image reading apparatus, an auto document feeder conveys a document onto a slit glass plate, and reads an image on the document while the document is passing through a reading position on the slit glass plate.

In the sheet-through system, an image reading unit fixed on one surface side of an elongated slit glass (transparent member) reads an image on a document by focusing light of an optical reading system on the image bearing surface of the document pass through the other side of the slit glass. Therefore, if a foreign matter, such as dust, adheres on the slit glass, a portion in which light is shielded by the foreign matter shows a streak of image noise in the read image.

Foreign matters adhering to the slit glass include paper powder flying from a document made mainly of paper, floating foreign matters such as dust in the atmospheric air, and adhesive foreign matters, such as a tape's adhesive agent, a peeling of paste, whiteout, and a clot of ball-point pen ink adhering to a document.

Various methods for removing foreign matters on the surface of the slit glass have conventionally been proposed. Among these methods, for example, a certain method utilizes a roller having an elastic member, such as a felt material and foaming material, as a cleaning member on a slit glass plate. The roller is rotatably provided to clean the surface of the slit glass by using the cleaning member to remove foreign matters from the surface of the slit glass (refer to Japanese Patent Application Laid-Open No. 2000-270152).

However, although floating foreign matters can be comparatively efficiently collected, the cleaning member made of an elastic member or a cleaning member composed of a conductive brush connected to the ground can sweep only a glass portion which the elastic member or the hair tip of the brush contacts. Therefore, it is difficult to efficiently remove adhesive foreign matters.

In particular, the effect of sweep decreases as viscosity of adhesive foreign matters decreases. Moreover, once an adhesive foreign matter adheres to the hair tip of the above-described brush-type cleaning member, the adhering foreign matter may return to the glass portion during cleaning by the rotation of the cleaning member, possibly expanding a foreign matter adhering area.

Further, once an adhesive foreign matter adheres to the hair tip of the brush of the brush-type cleaning member, the efficiency of collecting floating foreign matters by an electrostatic method decreases at the portion where the adhesive foreign matter adheres.

SUMMARY OF THE INVENTION

The present invention is directed to providing an image reading apparatus capable of removing both floating foreign matters and adhesive foreign matters to enable removing adhesive foreign matters as well as floating foreign matters in an efficient way, and an image forming apparatus including the image reading apparatus.

According to an aspect of the present invention, an image reading apparatus includes a transparent member disposed at a document pass position, an image reading unit configured to read an image of a passing document through the transparent member, and a rotating cleaning unit configured to rotate to clean a document pass surface of the transparent member. The rotating cleaning unit includes a main body rotatable centering on a rotational axis, a first cleaning member supported by the main body, and configured to scrape foreign matters on the document pass surface during rotation of the main body, and a second cleaning member supported by the main body, and configured to enable sweeping foreign matters on the document pass surface during rotation of the main body.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
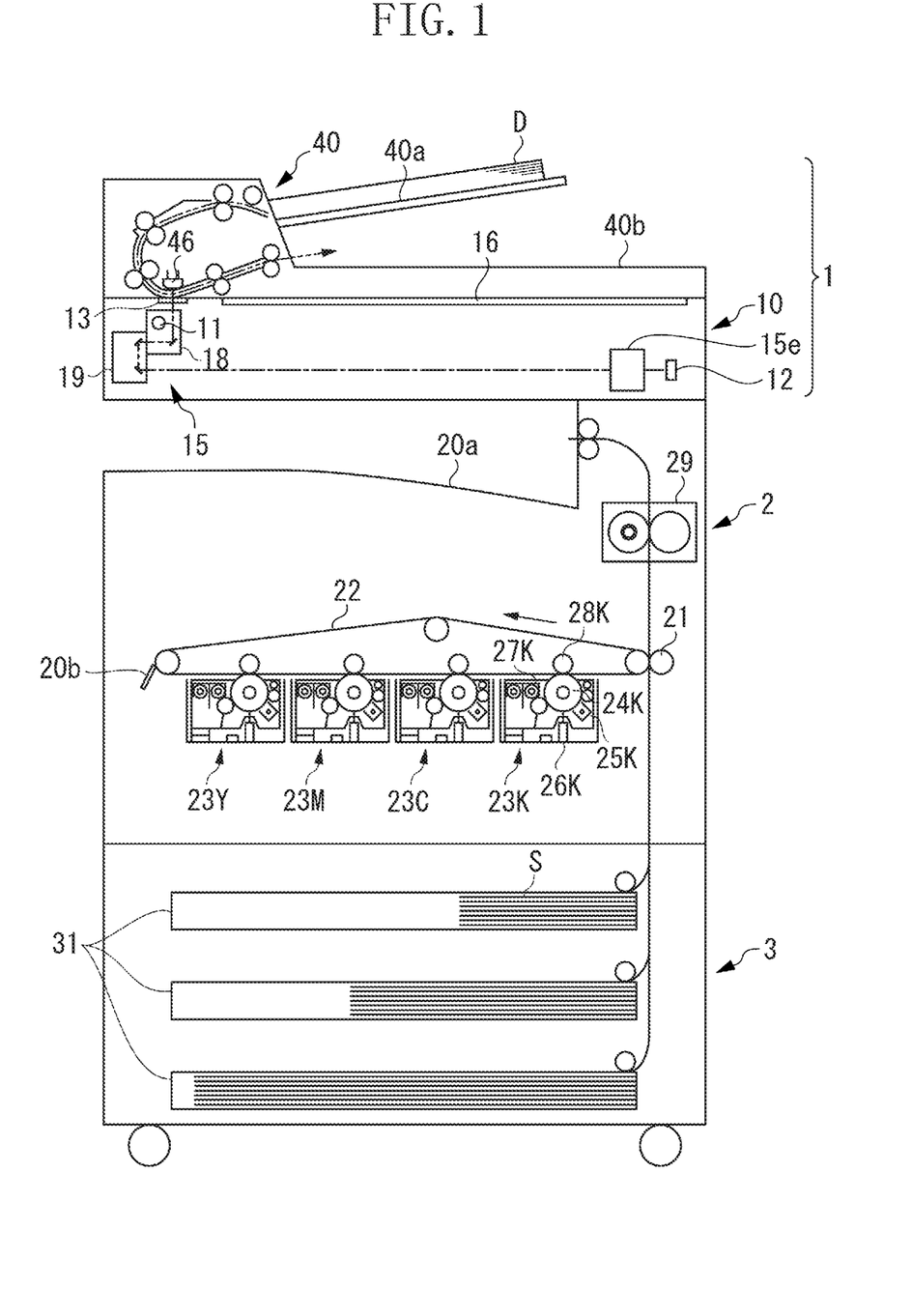
FIG. 1 is a schematic view illustrating a multifunction peripheral (MFP) apparatus which is an example of an image forming apparatus including an image reading apparatus according to the present invention.

The following describes a multifunction peripheral (MFP) apparatus as an exemplary embodiment of an image forming apparatus including an image reading apparatus according to the present invention. FIG. 1 is a schematic view illustrating a configuration of the MFP apparatus according to the present exemplary embodiment.

As illustrated in FIG. 1, the MFP apparatus includes an image forming apparatus 2, an image reading apparatus 1 connected to the image forming apparatus 2, and a sheet feeding apparatus 3 connected to the image forming apparatus 2.

The image reading apparatus 1 includes an image reading unit 10 which is provided on its top face with a slit glass 13 as a transparent plate member disposed at a position where a document D passes through, and a platen glass 16 as a document position glass plate. The image reading apparatus 1 further includes an automatic document feeder (ADF) 40 disposed on the image reading unit 10. The image reading unit 10 is configured to read through the slit glass 13 an image on the document D passing through the slit glass 13.

The automatic document feeder 40 conveys a document D placed on a document feeding tray 40a one by one onto the slit glass 13 of the image reading unit 10 to allow the document D to pass through the slit glass 13. The document D which has passed through the slit glass 13 is discharged onto a document discharge tray 40b.

The image reading unit (scanner unit) 10 irradiates with light from a illumination device 11 (linear light source) the image surface of the document D conveyed onto the slit glass 13 by the automatic document feeder 40, or the image surface of a document D placed on the platen glass 16. Then, an image reading member (line sensor) 12 is irradiated with reflected light from the image surface of the document D via a reducing optical system 15. Thus, the image reading member 12 outputs image data corresponding to the document image. A rare gas lighting device, such as a xenon lamp, an external electrode lighting device, and, in recent years, a light emitting diode (LED) are used as the illumination device 11.

The image forming apparatus 2 which includes the image reading apparatus 1 at the top and the sheet feeding apparatus 3 at the bottom further includes at the central portion an intermediate transfer belt 22 rotatable in a direction indicated by the arrow. The image forming apparatus 2 further includes image forming units 23Y (yellow), 23M (magenta), 23C (cyan), and 23K (black) for forming images of respective colors which are to be primarily transferred onto the intermediate transfer belt 22.

Referring to FIG. 1, the image forming unit 23K includes a photosensitive drum 24K, a charging unit 25K, an exposure unit 26K, and a developing unit 27K. Similarly, each of the other image forming units 23Y, 23M, and 23C also includes a photosensitive drum, a charging unit, an exposure unit, and a developing unit. A primary transfer roller 28K is disposed facing the photosensitive drum 24K of the image forming unit 23K. Similarly, each of the other image forming units 23Y, 23M, and 23C also includes a primary transfer roller.

A secondary transfer roller 21 and a belt cleaner 21 are disposed facing the intermediate transfer belt 22. The above-described image forming units 23Y, 23M, 23C, and 23K, the intermediate transfer belt 22, the secondary transfer roller 21, etc. constitute an image forming assembly for forming on a sheet S the image read by the image reading apparatus 1.

Further, a fixing unit 29 is disposed on the downstream side of the secondary transfer roller 21 in the conveyance direction. The secondary transfer roller 21 secondarily transfers the image onto the sheet S fed from a sheet cassette 31 disposed in the sheet feeding apparatus 3. The fixing unit 29 heats and presses the sheet S to fix the image thereon.

Figure 2:
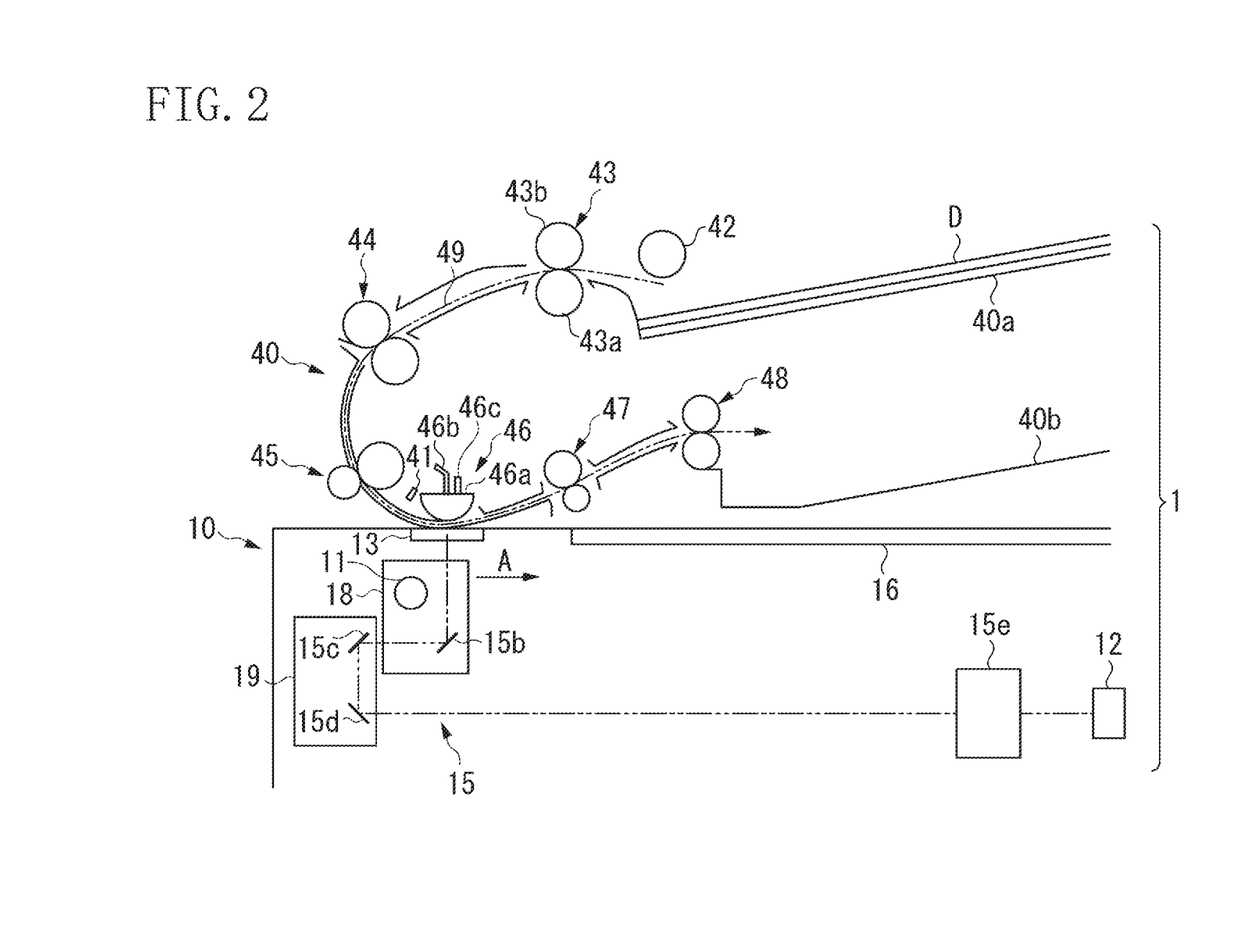
FIG. 2 is a schematic view illustrating the image reading apparatus according to the present exemplary embodiment.

FIG. 2 is a schematic view illustrating the image reading apparatus 1. The slit glass 13 disposed at the top of the image reading unit 10 is an elongated glass plate (slit) extending in the direction (main scanning direction) perpendicularly intersecting with the conveyance direction of the document D conveyed by the automatic document feeder 40. The slit glass 13 is disposed on a side portion upstream from the image reading unit 10 in the document D conveyance direction (sub scanning direction).

The platen glass 16 on which the document D is placed is disposed on the downstream side of the slit glass in the document conveyance direction (sub scanning direction) at an appropriate distance from the slit glass 13.

The document D placed on the document feeding tray 40a of the automatic document feeder 40 is sent out from the document feeding tray 40a to the conveyance path 49 by a pickup roller 42, and then conveyed to a separation roller pair 43. The separation roller pair 43 is a pair of a handling roller 43a and a feeding roller 43b pressing each other.

The separation roller pair 43 separates one sheet of the document D sent out by the pickup roller 42 at a nip portion between the handling roller 43a and the feeding roller 43b, and then conveys the document D to a registration roller pair 44. The registration roller pair sets the conveyed sheet of the document D to take a predetermined posture, and then conveys the document D to a pre-reading roller pair 45 at a predetermined timing.

The pre-reading roller pair 45 conveys the document D to the slit glass 13 at a predetermined timing to allow it to pass through the surface of the slit glass 13. A rotating cleaning member 46 is disposed above the slit glass 13. The rotating member 46 is rotated when the document D is not conveyed, to clean the surface of the slit glass 13. The rotating cleaning member 46 and a rotating cleaning member 46' (described below) are configured to rotate in one direction to clean the document pass surface of the slit glass 13 facing the image reading unit 10.

When the document D is conveyed by the pre-reading roller pair 45, the rotating cleaning member 46 is in a noncontact state (a state illustrated in FIG. 2) where a space is formed between the slit glass 13 and the rotating cleaning member 46. The document D passes through the space, and is conveyed by the post-reading roller pair 47.

The document D conveyed by the pre-reading roller pair 45 onto the slit glass 13 is detected by a pre-reading sensor (sheet-passing sensor) 41. Each of the leading and trailing edges of the document D is detected by the pre-reading sensor 41. Thus, the timing of reading an image by the image reading unit 10, and the rotation of the rotating cleaning member 46 are controlled.

The pre-reading roller pair 45 and the post-reading roller pair 47 rotate so that the document D passes through the slit glass 13 at a predetermined speed. The document D which has passed through the post-reading roller pair 47 is discharged onto the document discharge tray 40b by a discharge roller pair 48.

Under the slit glass 13 disposed in the image reading unit 10, the illumination device 11 (linear light source) is disposed along the main scanning direction on a first slider 18 which is slidable in the direction indicated by the arrow A.

When reading the document D conveyed by the automatic document feeder 40, the first slider 18 is stopped in a state where the illumination device 11 is positioned at a predetermined sheet-through position under the slit glass 13, as illustrated in FIG. 2. On the other hand, when reading a document on the platen glass 16, the first slider 18 is moved in the direction indicated by the arrow A illustrated in FIG. 2.

The reducing optical system 15 is disposed under the slit glass 13. The reducing optical system 15 leads to the image reading member 12 the reflected light from the document D which passes through the slit glass 13, or the reflected light from the document D which is placed on the platen glass 16. The image reading member 12 includes a charge-coupled device (CCD) mounted on a substrate. The CCD includes a plurality of photoelectric conversion elements arranged in the main scanning direction. The image reading member 12 further includes reflecting members 15*b*, 15*c*, and 15*d* such as mirrors, an optical element 15*e*, and a second slider 19.

Figure 3:
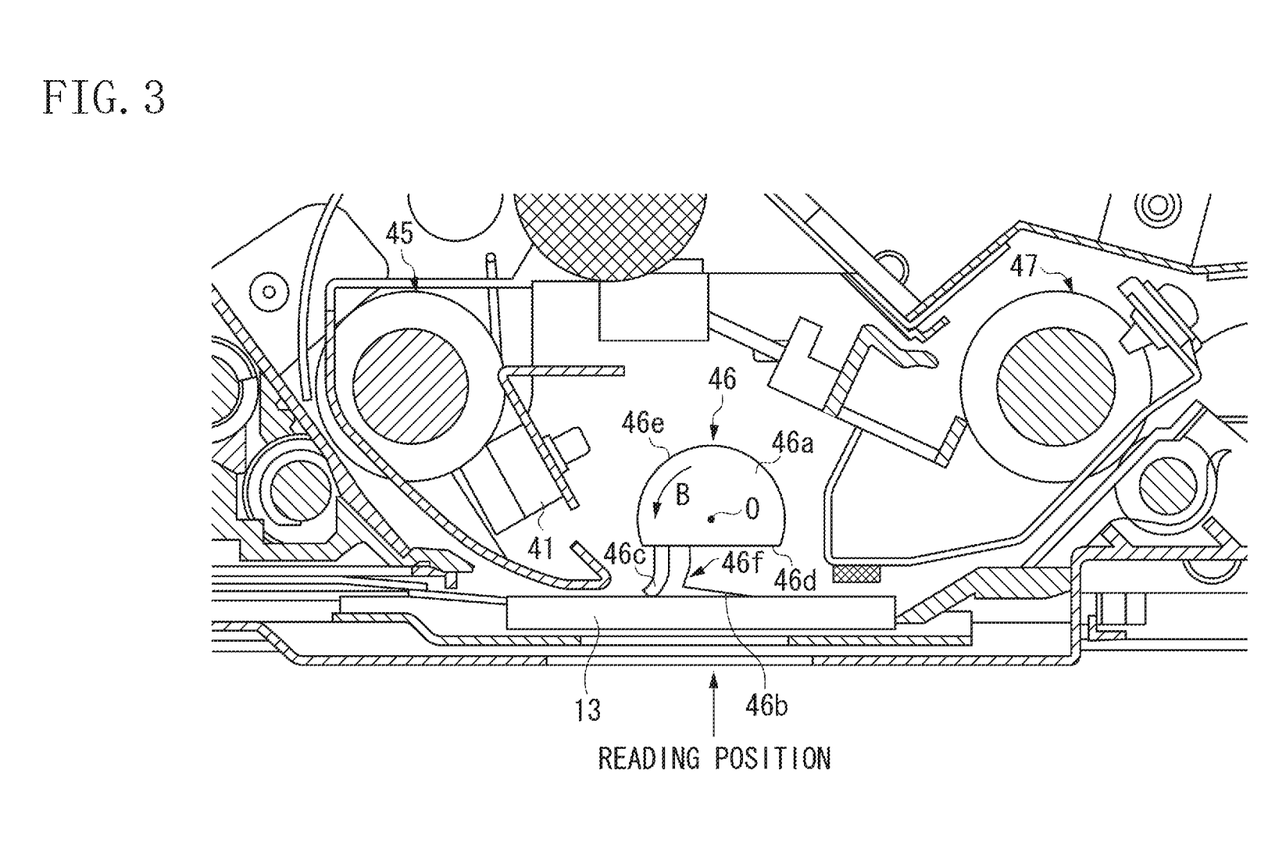
FIG. 3 is a cross-sectional view illustrating a specific configuration of essential parts in the image reading apparatus according to the present exemplary embodiment.
Figure 4A:
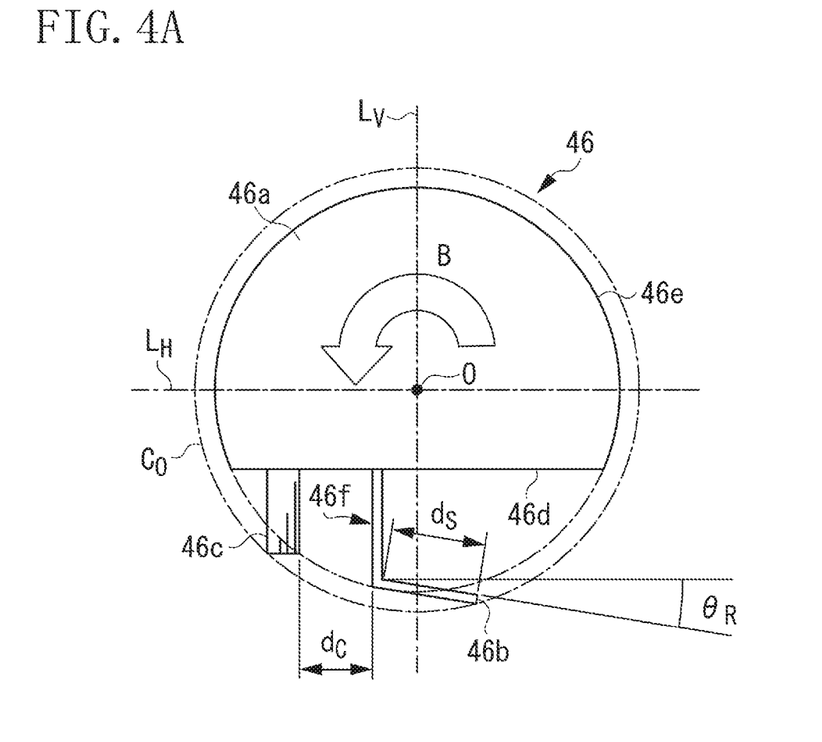
FIG. 4A is a schematic view illustrating a configuration of a rotating cleaning member disposed in the image reading apparatus.

Next, a configuration of essential parts of the image reading apparatus 1, and a configuration of the rotating cleaning member 46, will be described with reference to FIGS. 3, 4A, and 4B. FIG. 3 is a cross-sectional view illustrating a specific configuration of essential parts of the image reading apparatus 1. FIG. 4A is a schematic view illustrating a configuration of the rotating cleaning member 46.

As illustrated in FIGS. 3 and 4A, the rotating cleaning member 46 disposed above the slit glass 13 has a rotating member body portion 46*a* which is a roller member disposed in the main scanning direction (equivalent to the direction perpendicular to paper surface (from the front side to the back side of the drawing)) above the slit glass 13. The rotating member body portion 46*a* is disposed above the document pass surface of the slit glass 13, and is rotatable in one direction centering on an axial center (rotational axis) in non-contact with the document pass surface.

The rotating cleaning member 46 further has a first cleaning member 46*f* and a second cleaning member 46*c* attached to (supported by) the rotating member body portion 46*a*. The first cleaning member 46*f* is supported by the rotating member body portion 46*a* in such a way that a front-end portion of the first cleaning member 46*f* is protruded toward the downstream side in a rotational direction of the rotating member body portion 46*a* so as to scrape (pick up) foreign matters on the document pass surface while the rotating member body portion 46*a* is rotating in one direction. The second cleaning member 46*c* is supported on the upstream side of the first cleaning member 46*f* in a rotational direction of the rotating member body portion 46*a*, and configured to slidably contact the document pass surface so as to sweep foreign matters following the first cleaning member 46*f* while the rotating member body portion 46*a* is rotating in one direction.

The rotating member body portion 46*a* has, for example, such a shape that a part of a metal column body is cut out by a flat surface 46*d* parallel to the extending direction of the axial center O, i.e., a D-shaped cross section formed of the flat surface 46*d* parallel to the axial center O and an outer circumferential surface 46*e* having an approximately semicircular shape centering on the axial center O.

In this way, the rotating member body portion 46*a* has a cross section having an approximately semicircular shape formed of the outer circumferential surface 46*e* centering on the rotatable axial center (rotational axis) O and the flat surface 46*d* parallel to the axial center O, and is configured to be rotatable facing the document pass surface of the slit glass 13 in a non-contact state. Base portions of the first cleaning member 46*f* and the second cleaning member 46*c* are attached to the flat surface 46*d*. The first cleaning member 46*f* is composed of a wall portion supported so as to protrude from the flat surface 46*d* in the radial direction of rotation, and an inclined front-end portion 46*b* attached to the apical end of the wall portion.

The rotating member body portion 46*a* is rotated in the direction (counterclockwise direction) indicated by the arrow B illustrated in FIGS. 3 and 4A centering on the axial center O by a rotation drive apparatus, such as a stepping motor. The axial center (rotational axis) O of the rotating member body portion 46*a* is disposed above a light passing position (reading position). Light is reflected by the document D passing through the slit glass 13 and then led to the image reading member 12.

When the rotating member body portion 46*a* is rotated by the stepping motor, the outer circumferential surface 46*e* of the rotating member body portion 46*a* faces the slit glass 13 so as to provide a predetermined distance from the slit glass 13. More specifically, when the outer circumferential surface 46*e* of the rotating member body portion 46*a* faces the slit glass 13, the outer circumferential surface 46*e* is positioned at a distance of about 0.3 to 0.5 mm (minimum distance dR) from the slit glass 13. (For example, the distance dR illustrated in FIG. 4B is 0.3 to 0.5 mm.) Thus, the outer circumferential surface 46*e* is disposed so as to be positioned at a predetermined distance (minimum distance dR) from the slit glass 13 when the document D is passing through the document pass surface of the slit glass 13.

For example, a white polyethylene terephthalate (PET) film is stuck to the outer circumferential surface 46*e* of the rotating member body portion 46*a* to provide a white reference surface. When shading correction is carried out for the illumination device 11 and when the document D passes through the slit glass 13, the rotating member body portion 46*a* having the outer circumferential surface 46*e* as a white reference surface is driven and rotated, and then stopped so that the outer circumferential surface 46*e* faces the slit glass 13.

An outer circumferential surface position detecting sensor (not illustrated) for detecting that the outer circumferential surface 46*e* of the rotating member body portion 46*a* faces the slit glass 13 is disposed at one end of the rotating member body portion 46*a* in the longitudinal direction (from the front side to the back side of the drawing). Based on a detection signal from the outer circumferential surface detecting position sensor, the rotation of the rotating member body portion 46*a* is controlled.

As illustrated in FIG. 4A, the base portion of the first cleaning member 46*f* is attached to the flat surface 46*d* of the rotating member body portion 46*a* so that the base portion is approximately parallel to a perpendicular line LV of the flat surface 46*d* passing through the axial center (rotation center axis) O of the rotating member body portion 46*a*. Referring to FIG. 4A, a line LH perpendicularly intersects with the perpendicular line LV.

However, the front-end portion of the first cleaning member 46*f* is inclined by an angle θR with respect to the flat surface 46*d*. This front-end portion is configured as a inclined front-end portion 46*b* which is a thin plate and elastically bends when contacting the surface of the slit glass 13 by the rotation of the rotating member body portion 46*a*.

The distance (length) of the inclined front-end portion 46*b* is a predetermined distance ds or longer. As described later, the inclined front-end portion 46*b* is protruded toward the downstream side in the rotational direction so as to elastically bend by the rotation of the rotating member body portion 46*a* when contacting the surface of the slit glass 13. Further, the apical end of the inclined front-end portion 46*b* is positioned on an imaginary circle CO having a predetermined distance from the rotating member outer circumferential surface 46e. The above-described angle θR, distance ds, and imaginary circle CO will be described in detail below.

The inclined front-end portion 46b of the first cleaning member 46f is made of an elastic member so as to bend, contacting the surface of the slit glass 13 by the rotation of the rotating member body portion 46a. In the first cleaning member 46f, the base portion other than the inclined front-end portion 46b is made of a comparatively hard material.

The above-described elastic member is a thin-plate elastic member, such as a resin sheet (PET, etc.) having a thickness of, for example, 150 to 200 micrometers. The elastic member is attached to the flat surface 46d of the rotating member body portion 46a in the main scanning direction (the direction perpendicularly intersecting with the document conveyance direction) approximately over the total length of the slit glass 13.

On the other hand, as illustrated in FIG. 4A, the base portion of the second cleaning member 46c is attached to the flat surface 46d of the rotating member body portion 46a so that the base portion is approximately parallel to the perpendicular line LV of the flat surface 46d passing through the axial center O of the rotating member body portion 46a. The second cleaning member 46c is disposed on the upstream side from the first cleaning member 46f in the rotation direction of the rotating member body portion 46a so as to be at a fixed distance dC from the first cleaning member 46f.

The second cleaning member 46c is provided with a brush having a hair tip which bends when contacting the surface of the slit glass 13 during rotation of the rotating member body portion 46a. This brush is made of conductive fiber, and is connected to the ground (ground connection). This brush is attached to the flat surface 46d of the rotating member body portion 46a so as to have a fixed width (for example, about 2 mm) in the main scanning direction approximately over the total length of the slit glass 13. The length (height) of the second cleaning member 46c is such that at least the apical end on the upstream side is positioned on the imaginary circle CO. The second cleaning member 46c is composed of a brush having such a length (height) that it does not contact the document pass surface of the slit glass 13 simultaneously with the first cleaning member 46f.

Figure 4B:
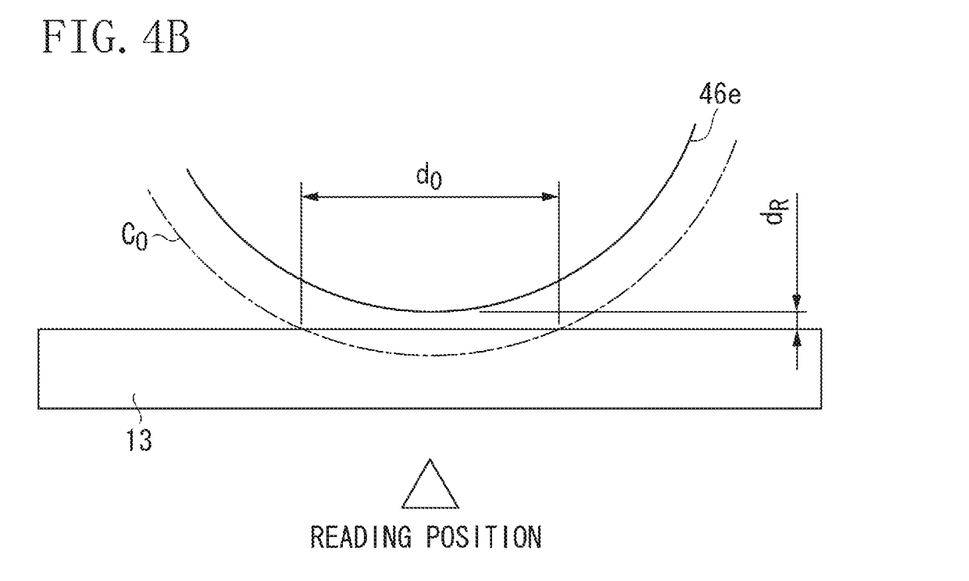
FIG. 4B is a cross-sectional view illustrating a locus of the rotating cleaning member.

FIG. 4B illustrates a state where the outer circumferential surface 46e faces the slit glass 13. The imaginary circle CO indicating a rotating locus overlaps with the surface (document pass surface) of the slit glass 13. The length dO of the overlapping area in the conveyance direction symmetrically covers the reading position, and is set to about 2 to 5 mm for example. Therefore, when the rotating member body portion 46a rotates in the direction indicated by the arrow B illustrated in FIG. 4A, the apical ends of the first cleaning member 46f and the second cleaning member 46c slide on the surface (document pass surface) of the slit glass 13, removing foreign matters present within the range of the length do in the conveyance direction.

The apical ends of the first cleaning member 46f and the second cleaning member 46c are positioned on the imaginary circle CO. Specifically, during rotation of the rotating member body portion 46a in one direction, the rotating locus of the apical end of the first cleaning member 46f and the rotating locus of the apical end of the second cleaning member 46c are on an approximately identical locus. Therefore, foreign matter removing areas of the two cleaning members on the slit glass 13 are identical over the length dO of the above-described overlapping area.

It is desirable that the length ds of the inclined front-end portion 46b of the first cleaning member 46f is equal to the length do of the above-described overlapping area in the conveyance direction because all of adhesive foreign matters adhering to the entire range of the length dO in the conveyance direction can be removed.

Figure 5:
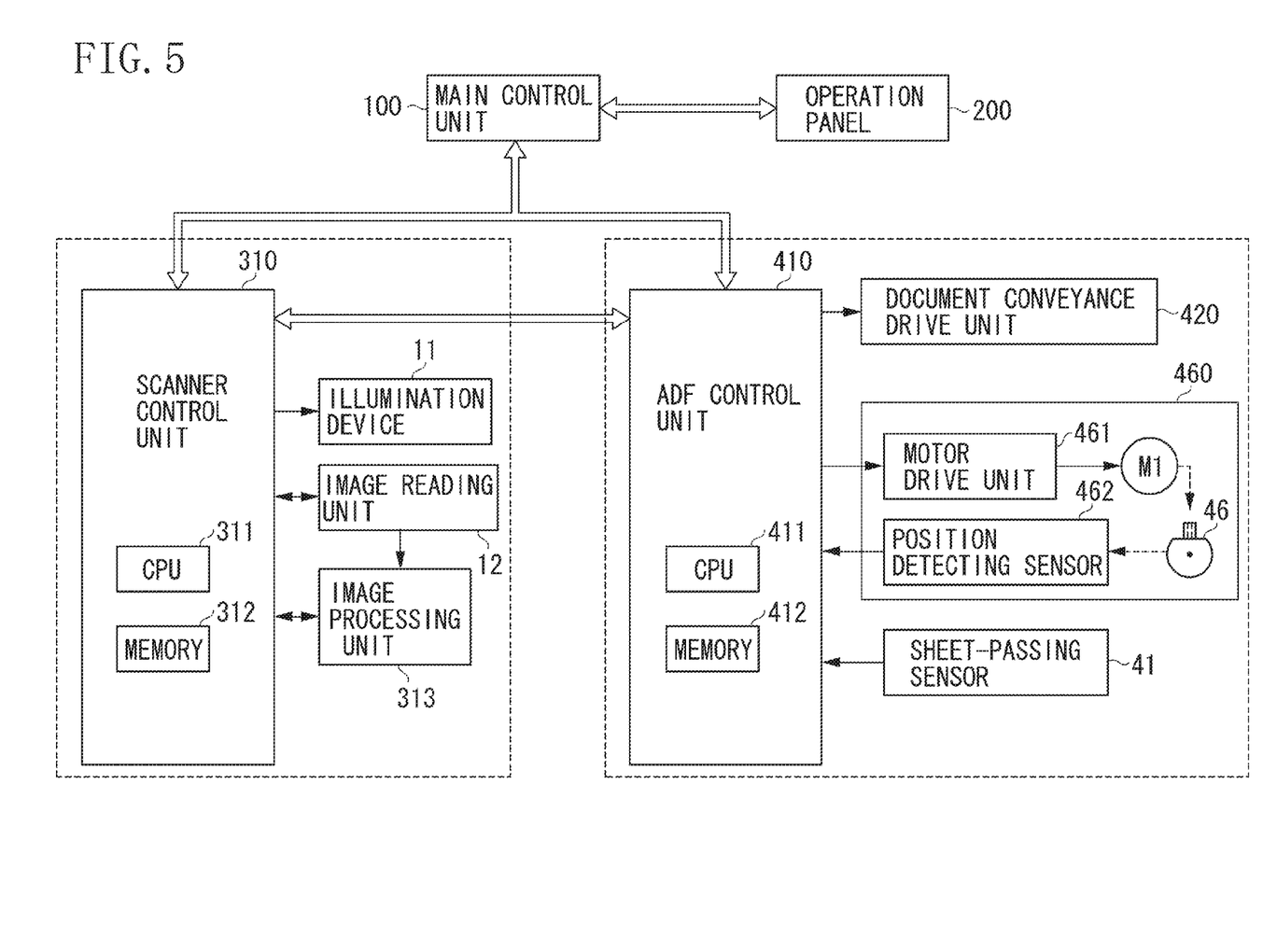
FIG. 5 is a block diagram illustrating a configuration for controlling the image reading apparatus according to the present exemplary embodiment.

FIG. 5 is a block diagram illustrating a configuration for controlling the image reading apparatus 1. The image reading apparatus 1 includes a main control unit 100 for comprehensively controlling the image reading unit 10 and the automatic document feeder 40.

An operation panel 200 operated by a user, a scanner control unit 310, and an ADF control unit 410 are connected to the main control unit 100.

The scanner control unit 310 includes a central processing unit (CPU) 311 and a memory 312. The illumination device 11, the image reading member 12, and an image processing unit 313 are connected to the scanner control unit 310.

The ADF control unit 410 includes a CPU 411 and a memory 412. A document conveyance drive unit 420 for driving the automatic document feeder 40, a rotating member drive unit 460 for rotatably driving the rotating cleaning member 46, and the pre-reading sensor (sheet-passing sensor) 41 are connected to the ADF control unit 410. The rotating member drive unit 460 includes a rotating member motor M1 for rotating the rotating cleaning member 46, a motor drive unit 461 for rotatably driving the rotating member motor M1, and a position detecting sensor 462 for detecting the rotational position of the rotating cleaning member 46.

For example, when the user instructs the operation panel 200 to start reading a document, the following control is performed. Specifically, in response to the reading start instruction input from the operation panel 200, the main control unit 100 outputs a document reading start command to the ADF control unit 410 of the automatic document feeder 40 and to the scanner control unit 310 of the image reading unit 10. Thus, the document image read operation in the image reading apparatus 1 is started.

When performing shading correction for the illumination device 11 before reading a document image, the image reading apparatus 1 having the above-described configuration rotates the rotating member body portion 46a so that the outer circumferential surface 46e of the rotating member body portion 46a of the rotating cleaning member 46 faces the slit glass 13. Thus, the outer circumferential surface 46e of the rotating member body portion 46a is stopped in a state where the minimum distance dR of about 0.3 to 0.5 mm from the slit glass 13 is kept.

In this way, the outer circumferential surface 46e is configured to serve as a white reference surface when performing shading correction for the light source (illumination device) 11 included in the image reading unit 10. Then, in the case of shading correction, the rotating cleaning member 46 rotates so that the outer circumferential surface 46e serving as a white reference surface is kept at a predetermined distance (minimum distance dR) from the slit glass 13.

When the illumination device 11 is turned ON in the above-described state, light emitted from the illumination device 11 is reflected by the outer circumferential surface 46e of the rotating member body portion 46a, and then projected onto the image reading unit (line sensor) 12 via the reducing optical system 15. The output of the image reading member 12 corresponds to the intensity of the reflected light from the outer circumferential surface 46e serving as a white reference surface. Shading correction is performed so that the output becomes uniform in the longitudinal direction of the illumination device 11.

When the image reading unit 10 reads an image of the document D conveyed by the automatic document feeder 40, similar to the case of shading correction, the rotating member body portion 46a is rotated so that the outer circumferential surface 46e of the rotating member body portion 46a of the rotating cleaning member 46 faces the slit glass 13. Thus, the minimum distance dR of about 0.3 to 0.5 mm is kept between the outer circumferential surface 46e of the rotating member body portion 46a and the slit glass 13.

In this state, the illumination device 11 is turned ON, and the document D passes through the document pass surface of the slit glass 13. The document D passing through the slit glass 13 reflects the light emitted from the illumination device 11, and then the reflected light is projected onto the image reading member 12 via the reducing optical system 15. Thus, the image on the image surface of the document D is read, and image data corresponding to the image is obtained.

The fact that the document D has passed through the slit glass 13 is detected in this way by the pre-reading sensor (sheet-passing sensor) 41. Thus, when image data for the image surface of one sheet of the document D has been obtained, the rotating member body portion 46a is rotated once by the rotating member motor M1, such as a stepping motor.

Figure 6:
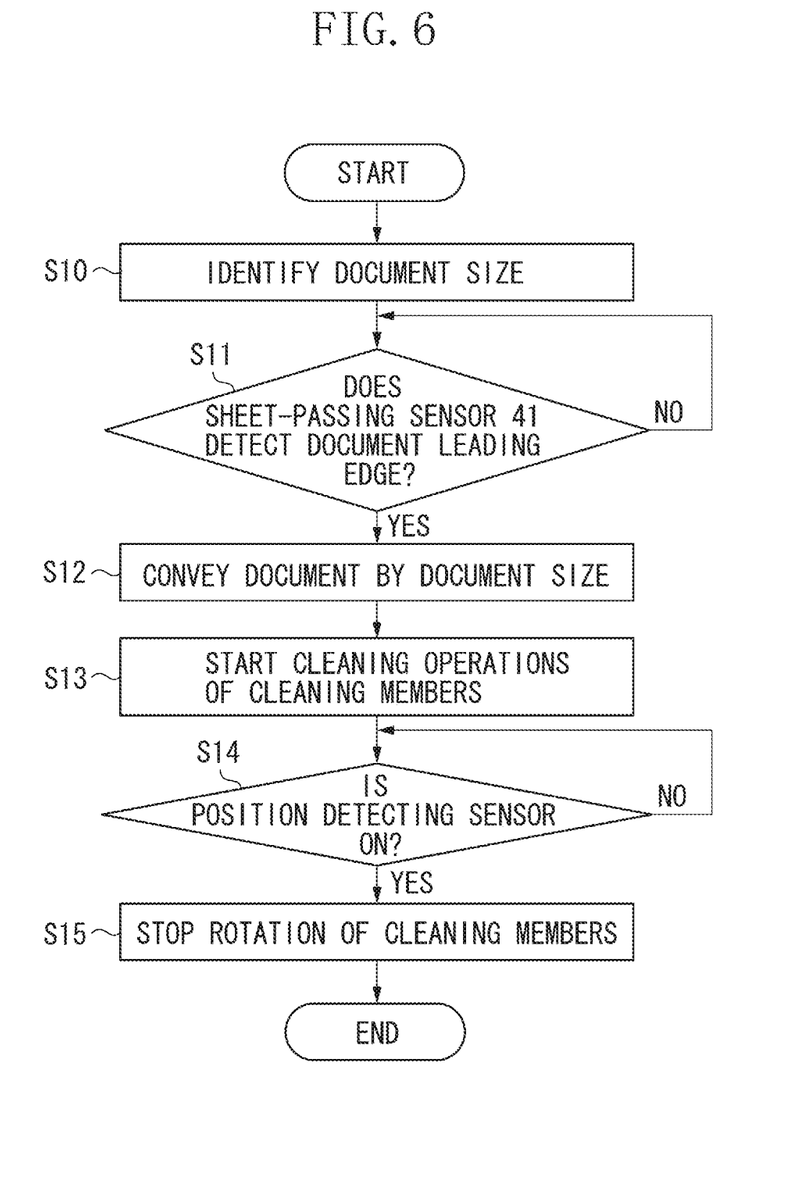
FIG. 6 is a flowchart illustrating a control sequence according to the present exemplary embodiment.

The following describes a processing sequence for controlling cleaning operations, with reference to FIG. 6. FIG. 6 is a flowchart illustrating a processing sequence for controlling cleaning operations of the rotating cleaning member 46.

When the processing is started, in step S10, the main control unit 100 performs document size identification processing. In step S11, the main control unit 100 determines whether the pre-reading sensor (sheet-passing sensor) 41 detects the leading edge of the document D. When it is determined that the pre-reading sensor (sheet-passing sensor) 41 has detected the leading edge of the document D (YES in step S11), then in step S12, the main control unit 100 conveys the document D by the document size based on the document size determined in step S10, and waits until the trailing edge of the document D passes through the reading position. At this timing, as described above, the outer circumferential surface 46e of the rotating cleaning member 46 is positioned so as to keep the minimum distance dR from the document pass surface of the slit glass 13.

In step S13, the motor drive unit 461 controlled by the ADF control unit 410 drives the rotating member motor M1 to start the rotation operation of the rotating cleaning member 46. In step S14, the main control unit 100 determines whether the position detecting sensor 462 is ON. When it is determined that the position detecting sensor 462 is ON (YES in step S14), i.e., the outer circumferential surface 46e of the rotating cleaning member 46 is positioned facing the reading position (refer to FIG. 3), then in step S15, the main control unit 100 stops the motor M1 to stop the rotation operation.

The following describes in detail cleaning operations of the first cleaning member 46f and the second cleaning member 46c by the rotation of the rotating member body portion 46a.

Figure 7A:
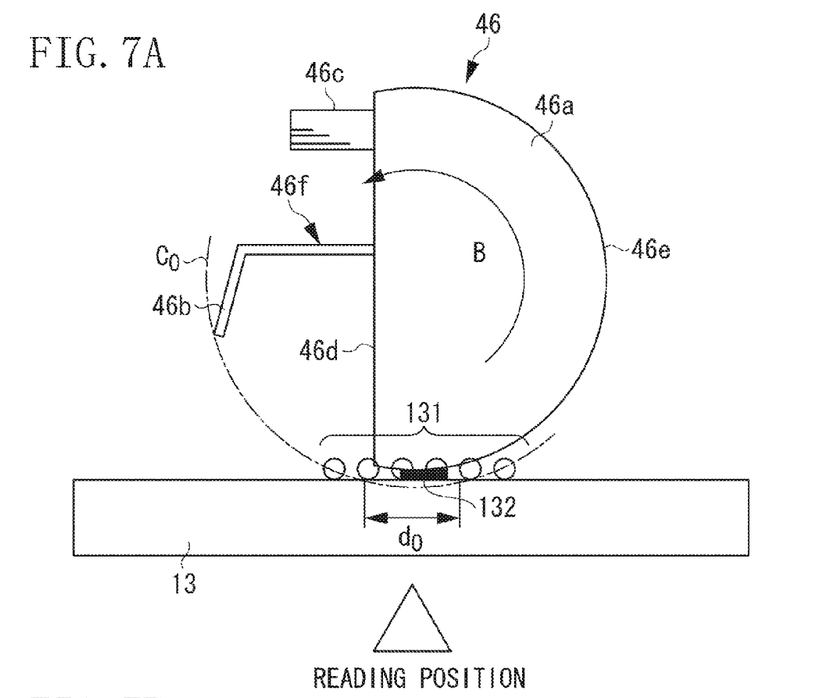
FIGS. 7A to 7C illustrate operations of the rotating cleaning member according to the present exemplary embodiment.
Figure 7B:
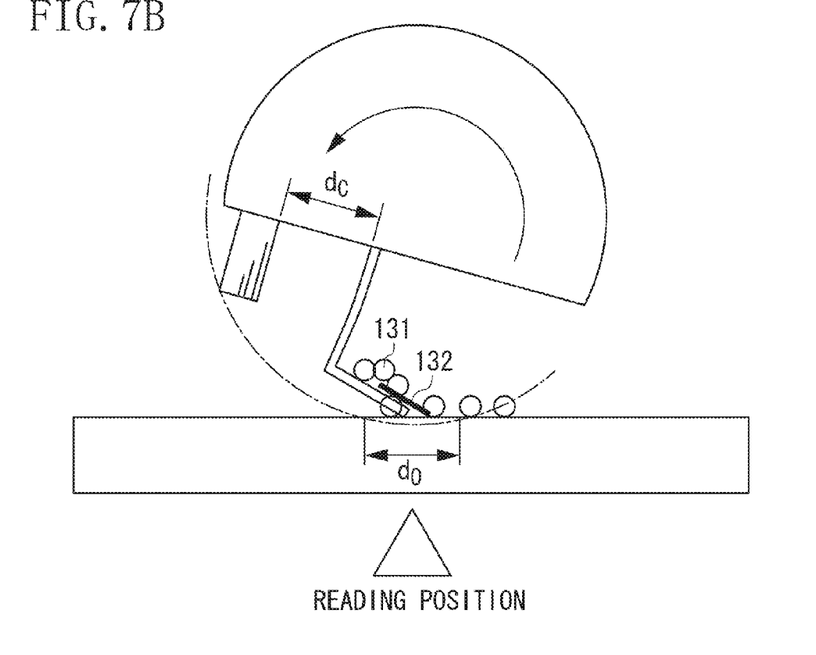

By the rotation of the rotating member body portion 46a, the state illustrated in FIG. 7A where neither the first cleaning member 46f nor the second cleaning member 46c contacts the slit glass 13, changes to the state illustrated in FIG. 7B where only the first cleaning member 46f contacts the slit glass 13. Then, the first cleaning member 46f and the second cleaning member 46c successively slide on the surface of the slit glass 13. In this case, since the inclined front-end portion 46b of the first cleaning member 46f is made of a thin-plate elastic member, such as a resin sheet, the inclined front-end portion 46b bends while in contact with and sliding on the surface of the slit glass 13.

The angle θR of the inclined front-end portion 46b (distance ds) illustrated in FIG. 4A is set so that the abutting angle at the moment when the first cleaning member 46f contacts the slit glass 13 becomes 45 degrees or less. This prevents an increase of pressing force generated at the moment when the inclined front-end portion 46b contacts the slit glass 13, enabling the inclined front-end portion 46b to smoothly move (slide) on the surface of the slit glass 13.

Thus, floating foreign matters 131, such as paper powder and dust, and adhesive foreign matters 132, such as a paste and whiteout, on the surface of the slit glass 13 are peeled off and scraped (picked up) from the surface of the slit glass 13 by the inclined front-end portion 46b of the first cleaning member 46f in a bent state.

The distance dC between the first cleaning member 46f and the second cleaning member 46c is set so that when the first cleaning member 46f is bent in contact with the slit glass 13, the first cleaning member 46f does not contact the second cleaning member 46c by the rotation of the rotating member body portion 46a.

As described above, scraping areas (cleaning areas) for the first cleaning member 46f and the second cleaning member 46c on the slit glass 13 are identical over the length dO of the above-described overlapping area dO in the conveyance direction. In this way, by removing at least adhesive foreign matters 132 with the first cleaning member 46f before the second cleaning member 46c contacts the slit glass 13, adhesive foreign matters 132 can be prevented from adhering to the apical end of the second cleaning member 46c.

Figure 7C:
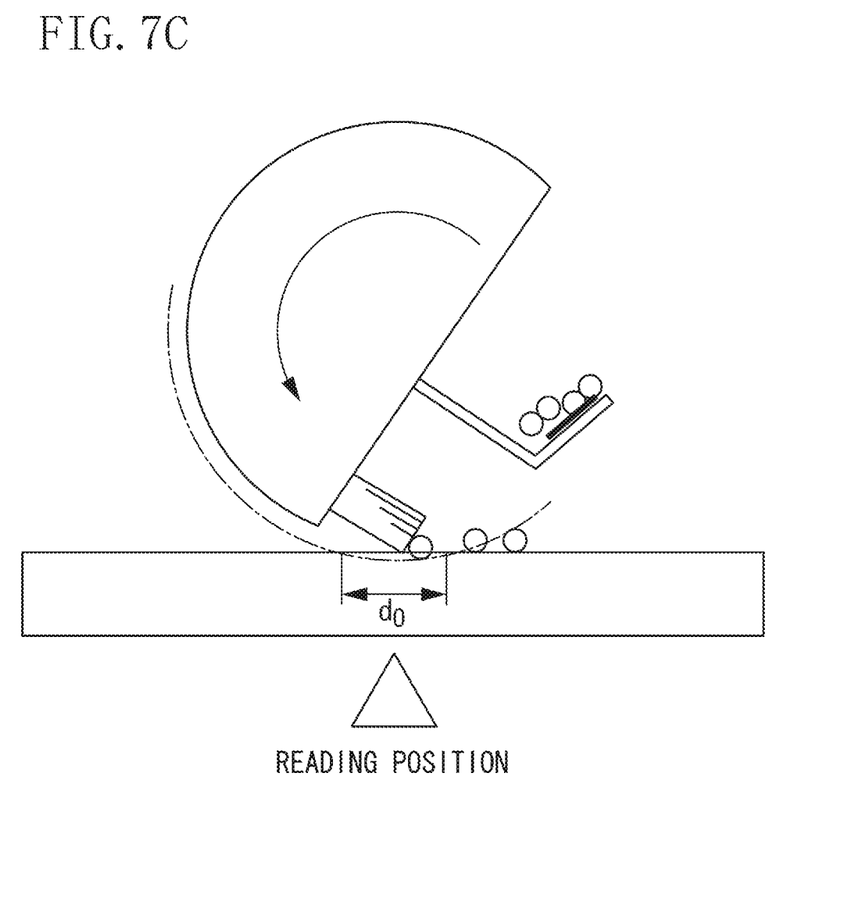

Then, as the rotating member body portion 46a further rotates in the direction indicated by the arrow B, the second cleaning member 46c contacts the slit glass 13 and starts sliding. Then, as illustrated in FIG. 7C, when the brush-type second cleaning member 46c contacts the slit glass 13 and starts sliding, the apical end of the second cleaning member 46c is bent. In this state, remaining floating foreign matters 131 that have not been completely peeled off by the first cleaning member 46f are removed from the surface of the slit glass 13.

The second cleaning member 46c is composed of a conductive brush, and is connected to the ground. Specifically, the second cleaning member 46c is composed of a conductive brush having conductivity and being connected to the ground which is made of a different material from the first cleaning member 46f. Therefore, in particular, the second cleaning member 46c is able to electrostatically adsorb floating foreign matters 131 to efficiently collect them.

Figure 8A:
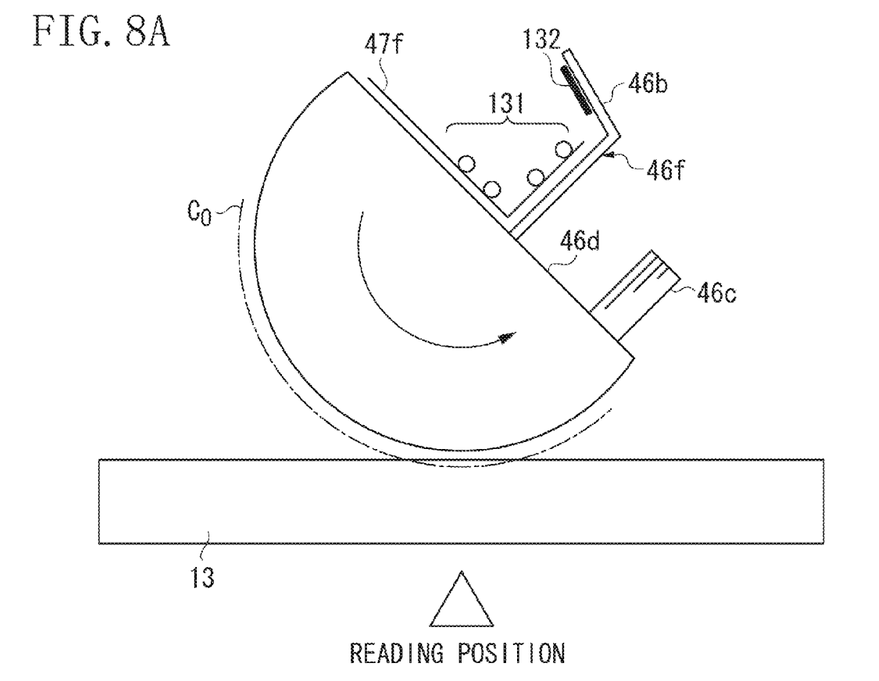
FIG. 8A illustrates a state where the rotating cleaning member further rotates from the state illustrated in FIG. 7C.

As the rotating member body portion 46a further rotates, as illustrated in FIG. 8A, the floating foreign matters 131 picked up by the first cleaning member 46f drop onto the flat surface 46d. Although the floating foreign matters 131 may possibly drop again onto the slit glass 13 when the rotating member body portion 46a further rotates, they can be removed again from the surface of the slit glass 13 by the first cleaning member 46f and the second cleaning member 46c.

Further, as illustrated in FIG. 8A, a double-sided adhesive tape 47f can be stuck. When the double-sided adhesive tape 47f is attached to the side portion of the above-described wall portion of the first cleaning member 46f on the upstream side in the rotational direction and to the flat surface 46d, the above-described floating foreign matters 131 that have dropped can be effectively collected, by using the viscosity of the double-sided adhesive tape 47f.

The main control unit 100 performs control so that, when the rotating member body portion 46a of the rotating cleaning member 46 rotates once, the rotation of the rotating member body portion 46a is stopped. This results in a state where the outer circumferential surface 46e of the rotating member body portion 46a faces the slit glass 13 to keep the minimum distance dR from the slit glass 13. Then, when a new document D is conveyed onto the slit glass 13, an image on the image surface of the document D is read.

At that time, since adhesive foreign matters and floating foreign matters have been removed from the slit glass 13 by the first cleaning member 46f and the second cleaning member 46c, there is no possibility that line noise occurs in image data output from the image reading member 12. Subsequently, the main control unit 100 repeats a sequence of reading an image on the image surface of the document D and cleaning the surface of the slit glass 13.

The rotating cleaning member 46 is composed of a plurality of members made of different materials in this way, for example, the first cleaning member 46f made of a thin-plate elastic member, such as a PET sheet, and the second cleaning member 46c composed of a conductive brush connected to the ground. This configuration can provide the rotating cleaning member 46 capable of removing floating foreign matters 131 and capable of removing adhesive foreign matters 132.

The first cleaning member 46f which first contacts the slit glass 13 during rotation of the rotating cleaning member 46 is configured to remove adhesive foreign matters 132. This configuration enables preventing the removing capability of the second cleaning member 46c from degrading because of adhesive foreign matters 132 adhering thereto, thus contributing to extending the life of the rotating cleaning member 46.

Figure 8B:
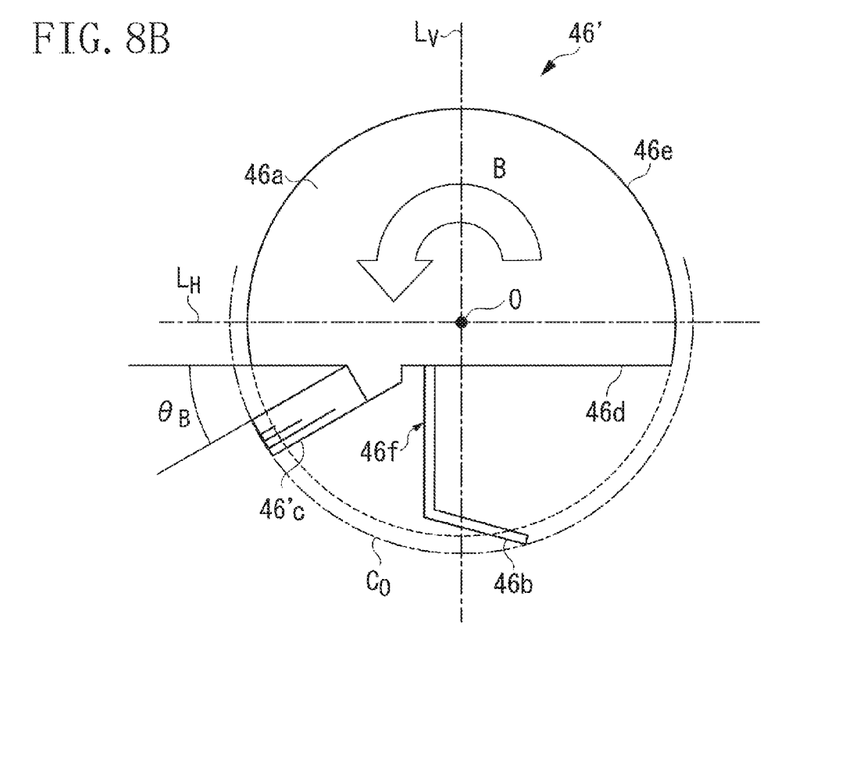
FIG. 8B is a cross-sectional view illustrating a schematic configuration of a modification of the present exemplary embodiment.

Although, in the above-described exemplary embodiment, both the first cleaning member 46f and the second cleaning member 46c of the rotating cleaning member 46 are disposed approximately perpendicularly to the flat surface 46d of the rotating member body portion 46a, the present invention is not limited to such a configuration. For example, as with the rotating cleaning member 46' illustrated in FIG. 8B, a second cleaning member 46'c may be attached to the flat surface 46d inclined toward the upstream side in the rotational direction by an angle θB with respect to the flat surface 46d.

Figure 9A:
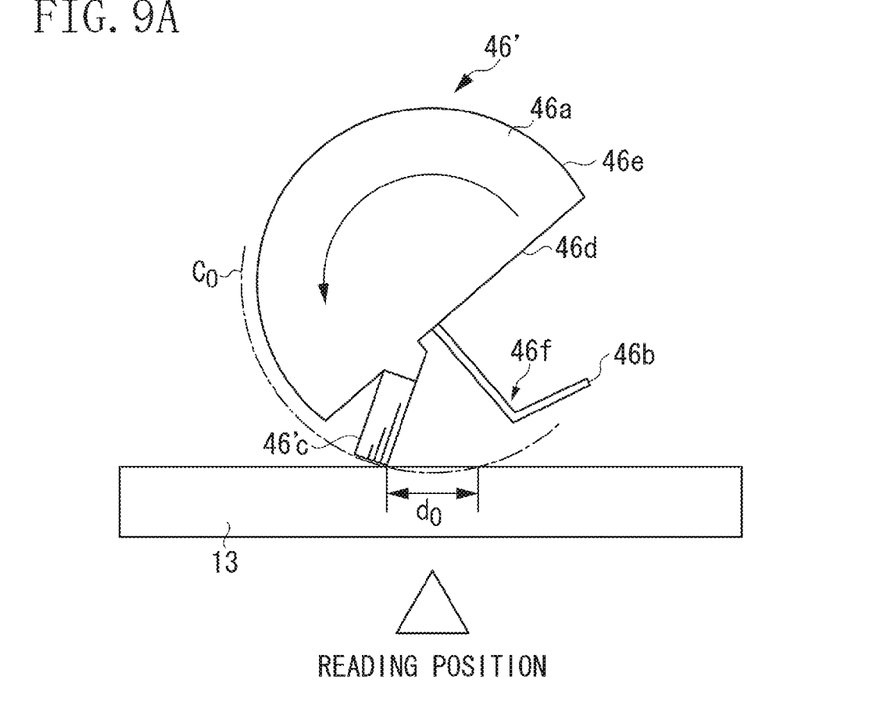
FIG. 9A to 9C illustrates operations of a rotating cleaning member according to the modification of the present exemplary embodiment.
Figure 9B:
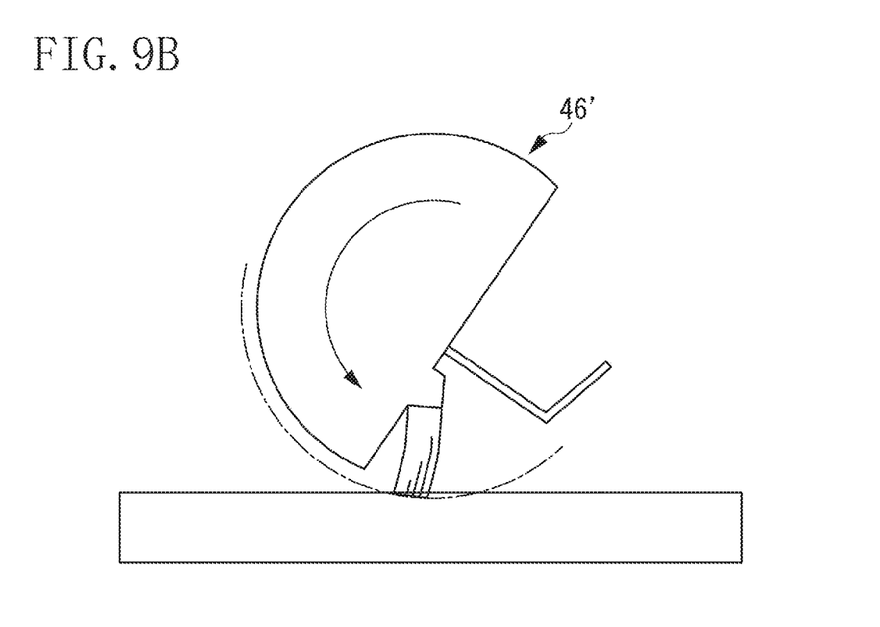
Figure 9C:
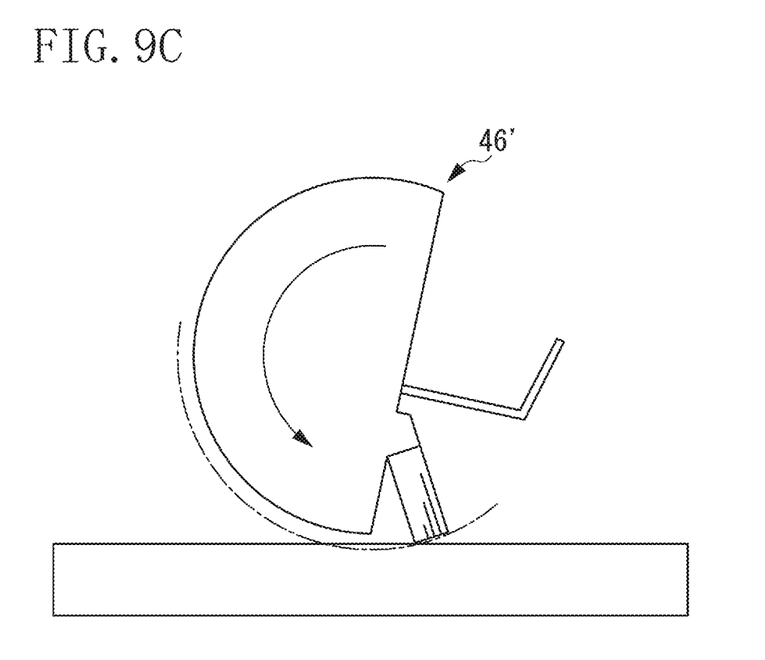

FIGS. 9A to 9C illustrate how the second cleaning member 46'c attached to the flat surface 46d inclined by the angle θB as described above sweeps the slit glass 13.

In this configuration, since a lot of hair of the conductive brush of the second cleaning member 46'c contacts the slit glass 13, floating foreign matters can be electrostatically absorbed and removed in a more efficient way, and the sliding hair tip of the brush can be distributed in proper balance. Thus, wear deterioration of the brush tip due to sliding can be delayed.

Although, in the above-described exemplary embodiment, the outer circumferential surface 46e of the rotating member body portion 46a is utilized as a white reference surface for shading correction, the configuration is not limited thereto.

Although, in the above-described exemplary embodiment, the rotating member body portion 46a is rotated once each time a document is read, i.e., in a duration of time since when the previous document has been read till when the following document starts being read, the timing of cleaning by the rotating cleaning member 46 is not limited thereto. For example, a method of rotating the rotating member body portion 46a once before starting the read operation for the first document, or a method of rotating the rotating member body portion 46a once when the power is turned ON may be applied.

The present exemplary embodiment provides both the capability of removing floating foreign matters and the capability of removing adhesive foreign matters, enabling efficiently removing adhesive foreign matters together with floating foreign matters.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-275587 filed Dec. 18, 2012, which is hereby incorporated by reference herein in its entirety.

What is claimed is:

1. An image reading apparatus comprising:
a transparent member disposed at a document pass position;
an image reading unit configured to read an image of a passing document through the transparent member; and
a rotating cleaning unit configured to rotate to clean a document pass surface of the transparent member,
wherein the rotating cleaning unit comprises:
a main body rotatable centering on a rotational axis;
a first cleaning member supported by the main body, and configured to scrape foreign matters on the document pass surface during rotation of the main body,
wherein the first cleaning member includes a base portion and a front-end portion, and
wherein, when the front end portion does not contact the document pass surface and before the front end portion contacts the document pass surface, the front-end portion of the cleaning member is bent directionally from the base portion towards a downstream side in the rotating direction of the main body; and
a second cleaning member supported by the main body, and configured to sweep foreign matters on the document pass surface during rotation of the main body.

2. The image reading apparatus according to claim 1, wherein the first cleaning member is a thin-plate member which elastically bends when contacting the surface of the transparent member by the rotation of the main body, and
wherein the second cleaning member is a brush.

3. The image reading apparatus according to claim 2, wherein the second cleaning member is a conductive brush having conductivity and connected to the ground.

4. The image reading apparatus according to claim 2, wherein the brush of the second cleaning member is supported on an upstream side from the first cleaning member on the main body in the rotational direction of the rotating cleaning unit.

5. The image reading apparatus according to claim 1, wherein the main body has a cross section having an approximately semicircular shape formed of an arc-shape surface and a flat surface parallel to the rotational axis, and
wherein the first cleaning member and the second cleaning member are attached to the flat surface.

6. The image reading apparatus according to claim 5, wherein the base portion is supported so as to protrude from the flat surface in the radial direction at the time of rotation.

7. The image reading apparatus according to claim 6, wherein a double-sided adhesive tape is attached to the side portion of the base portion and to the flat portion.

8. The image reading apparatus according to claim 5, wherein the rotating cleaning unit is positioned and disposed so that the arc-shape surface keeps a predetermined distance from the transparent member when a document passes through the document pass surface.

9. The image reading apparatus according to claim 5, wherein the arc-shape surface serves as a white reference surface when performing shading correction for an illumination device provided in the image reading unit.

10. The image reading apparatus according to claim 9, wherein the rotating cleaning unit rotates to come to a position where the arc-shape surface serving as the white reference surface faces the transparent member when performing shading correction.

11. The image reading apparatus according to claim 1, wherein, during rotation of the main body, the rotating locus of the apical end of the first cleaning member and the rotating locus of the apical end of the second cleaning member are on an approximately identical locus.

12. An image forming apparatus comprising:
the image reading apparatus according to claim 1; and
an image forming unit configured to form on a sheet an image read by the image reading apparatus.

13. The image reading apparatus according to claim 1, wherein an abutting angle of a front-end portion and a document pass surface at a moment when the front-end portion and the document pass surface contacts is 45 degree or less.

14. The image reading apparatus according to claim 1, wherein a front edge of the front end-portion contacts the document surface.

15. An image reading apparatus comprising:
a transparent member disposed at a document pass position;
an image reading unit configured to read an image of a passing document through the transparent member; and
a rotating cleaning unit configured to rotate to clean a document pass surface of the transparent member,
wherein the rotating cleaning unit comprises:
a main body rotatable centering on a rotational axis;
a thin-plate elastic member supported by the main body, and configured to contact the document pass surface during rotation of the main body
wherein the thin-plate elastic member includes a base portion and a front-end portion, and
wherein when the front end portion does not contact the document pass surface and before the front end portion contacts the document pass surface, the front-end portion of the thin-plate elastic member is bent directionally from the base portion towards a downstream side in the rotating direction of the main body; and
a brush supported by the main body, and configured to contact the document pass surface during rotation of the main body.

16. The image reading apparatus according to claim 15, wherein the brush is supported on an upstream side from the elastic member on the main body in the rotational direction of the rotating cleaning unit.

17. The image reading apparatus according to claim 15, wherein the main body has a cross section having an approximately semicircular shape formed of an arc-shape surface and a flat surface parallel to the rotational axis, and
wherein the elastic member and the brush are attached to the flat surface.

18. The image reading apparatus according to claim 17, wherein a double-sided adhesive tape is attached to the flat surface.

19. The image reading apparatus according to claim 17, wherein the arc-shape surface serves as a white reference surface when performing shading correction for an illumination device provided in the image reading unit.

20. The image reading apparatus according to claim 15, wherein, during rotation of the main body, the rotating locus of the apical end of the elastic member and the rotating locus of the apical end of the brush are on an approximately identical locus.

21. The image reading apparatus according to claim 15, wherein an abutting angle of a front-end portion and a document pass surface at a moment when the front-end portion and the document pass surface contacts is 45 degree or less.

22. The image reading apparatus according to claim 15, wherein a front edge of the front end-portion contacts the document surface.

* * * * *